United States Patent

Reichelt, Jr. et al.

[11] 4,097,716
[45] Jun. 27, 1978

[54] WELDING METHOD

[75] Inventors: Walter R. Reichelt, Jr.; Malcolm G. Hoy, both of New Kensington, Pa.

[73] Assignee: Aluminum Company of America, Alcoa Center, Pa.

[21] Appl. No.: 726,786

[22] Filed: Sep. 27, 1976

[51] Int. Cl.² ............................................. B23K 9/02
[52] U.S. Cl. ................................ 219/137 R; 219/73.1
[58] Field of Search .............. 219/73 R, 74, 105, 118, 219/137 WM, 137 R, 61

[56] References Cited

U.S. PATENT DOCUMENTS

| Re. 22,725 | 2/1946 | Von Ahrens | 219/137 R X |
|---|---|---|---|
| 1,499,770 | 7/1924 | Gruenfeldt | 219/137 R |
| 3,288,982 | 11/1966 | Suzuki et al. | 219/137 R |
| 3,825,712 | 7/1974 | Gibbs | 219/137 R |

Primary Examiner—J. V. Truhe
Assistant Examiner—N. D. Herkamp

[57] ABSTRACT

A welding method for forming a fillet welded joint including the steps of placing an abutting edge of a first metal member onto a surface of a second metal member at generally right angles thereto, the abutting edge having a series of alternating lands and slots extending through the entire thickness of the first member, and arc welding employing a consumable electrode to form a fully penetrated fillet weld from one side only of the joint with the weld filling the slots and melting the lands.

5 Claims, 2 Drawing Figures

U.S. Patent      June 27, 1978      4,097,716

WELDING METHOD

The invention herein described was made in the course of or under a contract or subcontract thereunder with the Department of Defense, Department of the Navy, Naval Sea Systems Command.

BACKGROUND OF THE INVENTION

The present invention relates to a method of welding and more particularly to a method of forming a fillet welded joint between two aluminum members from a single side of the joint.

Normally when welding two contacting metal members which are positioned approximately at right angles to each other, a fillet weld is applied along both sides of the joint. However in some structural applications in which a fillet welded joint is desired, there is ready access to only one side of the joint.

SUMMARY OF THE INVENTION

It is a primary object of the present invention to provide a novel welding method capable of producing a fillet welded joint between two metal members operating from a single side of the joint. Another object of the present invention is to provide a single-sided fillet weld of good strength characteristics which can be inspected from the backside of the joint.

These as well as other objects, which will become apparent in the discussion which follows, are achieved, according to the present invention, by providing a welding method for forming a fillet welded joint including the steps of placing an abutting edge of a first metal member onto the surface of a second metal member at generally right angles thereto, the abutting edge having a series of alternating lands and slots extending through the entire thickness of the first member, and arc welding employing a consumable electrode to form a fully penetrated fillet weld from one side only of the joint with the weld filling the slots and melting the lands.

DESCRIPTION OF THE PREFERRED EMBODIMENTS

Figure 1:
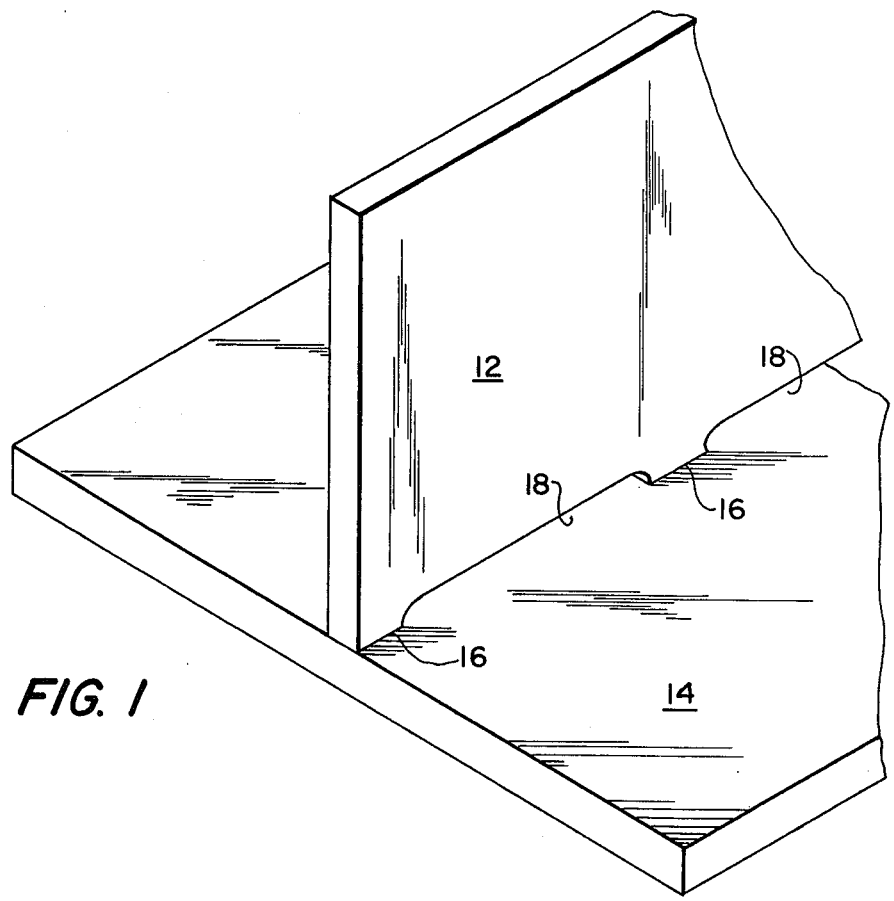
FIG. 1 is a perspective view of two abutting metal members at right angles to each other prior to forming the fillet weld.

Referring now to FIG. 1, there is illustrated two aluminum members 12, 14 disposed at right angles to each other with the vertical member 12 having an abutting edge resting on the upper surface of the horizontal member 14. The abutting edge of the vertical member 12 is comprised by a series of alternating lands 16 and slots 18. The lands contact the surface of the horizontal member 14 and slots 18 constitute cut out portions extending through the entire thickness of the member 12 so that in these regions there are gaps between the two members. The slots 18 may be formed by machining or punching techniques carried out beforehand.

The joint between members 12 and 14 is welded from a single side of the joint using a high heat input, high speed welding technology known as gas metal-arc (MIG) welding which employs a consumable aluminum electrode and an inert gas atmosphere. By this technique there is obtained a single fillet weld which penetrates through the thickness of the vertical member 12 even in the regions of the narrow lands 16 which melt during the welding.

The width of the lands 16 and the height and width of the slots 18 are significant parameters to the successful practice of the present method. The lands 16 which are necessary to assure that the desired spacing between the two sheets in the regions of gaps 18 would be maintained during welding, must be sufficiently narrow that they will melt readily in the welding arc and will provide little interference and restriction to weld penetration so that penetration of the weld through the entire member 12 may be obtained. Both the height and width of the slot 18 should be closely controlled to obtain the desired weld penetration. If the lengths of the slots are too large, there can be a problem of deflection of the horizontal member 14 up into the slots. Too small a height of the slots will undesirably impede the flow and penetration of the weld metal. It has been found that the height of the slot must be held to a maximum of about 0.040 inches for a ⅛-inch thick vertical aluminum member in order to prevent burn through to the other side of the joint. A land length to slot length ratio in the range of about 1:20 to 1:1 has been found suitable. By way of example, it has been found that when employing a ⅛ inch thick vertical member 12, and with the welding parameters designed to produce a ⅛ inch fillet weld, good results have been obtained when the lands 16 are ¼ inch long and the slots 18 are 1⅛ inch long and 0.040 inches in height. Employing members with these dimensions completely penetrated single-pass fillet welds have been obtained.

The techniques of gas metal-arc (MIG) welding are known in the art. For aluminum, this process employs a consumable, bare aluminum electrode in an inert gas atmosphere. The inert gas atmosphere may be helium, argon or a mixture of the two. No flux is required and thus post-cleaning costs and difficulties are avoided. Gas metal-arc (MIG) welding concentrates the heat more than most other welding methods.

Gas metal-arc (MIG) welding is further described in the literature, for example, in "Welding Alcoa Aluminum", Chapter 4, 1972, Aluminum Company of America, and in U.S. Pat. No. 3,944,781 issued Mar. 16, 1976 to Urbanic et al.

Among the advantages of the invention are that by this method a completely penetrated single-pass fillet weld may be obtained when welding from one side of the joint, the single welding arc is controlled by one operator resulting in savings as compared to a typical double fillet weld technique, the single-sided fillet weld may be visually inspected from the back side of the weld joint permitting good quality control and assurance of adequate penetration, there is reduced filler metal consumption and expense, and there is reduction in transverse and longitudinal distortion as a result of a reduction in total weld solidification shrinkage. Furthermore, an improvement in fatique strength can be realized when compared to conventional single-side fillet welds.

Figure 2:
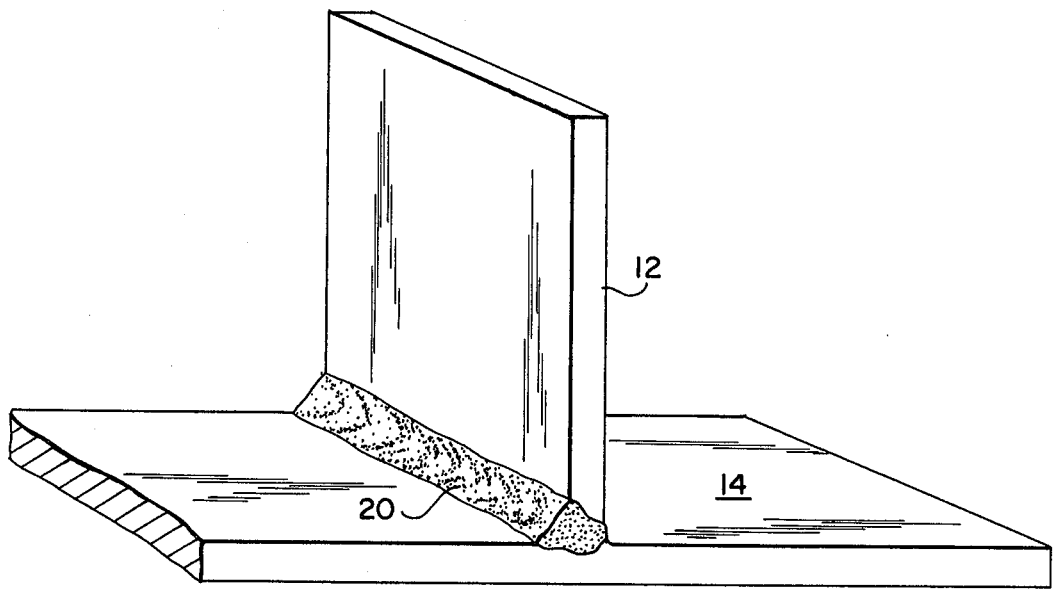
FIG. 2 is a perspective view taken of the members of FIG. 1 after the fillet weld has been formed.

FIG. 2 which is a perspective view of the welded joint shows that the weld 20 has completely penetrated through member 12.

The invention will be further illustrated by the following examples:

EXAMPLE 1

A vertical aluminum sheet ⅛ inch thick (by 2 inches by 3 inches) was treated at the abutting edge to obtain slots 1 inch in length and 0.040 inches in height. The slots were separated from each other by lands 1 inch long. This abutting edge was placed onto a horizontal aluminum sheet of 3/16 inch thickness. Both of these members were made of aluminum alloy 5456. A single sided fillet weld was produced using gas metal-arc (MIG) welding. The power source was a Tek-Tran variable slope 1,000 ampere DC power supply welding machine. The slope of the characteristic ampere/volt curve of the machine was set at 75 percent. The welding current was 220 amperes and the arc voltage was 20 volts. The welding head was set to move along the joint at a speed of 80 inches per minute. The consumable aluminum electrode which had a diameter of 3/64 inch was fed at a speed of 504 inches per minute. The inert gas atmosphere was a mixture of argon and helium, each in an amount of 30 standard cubic feet per hour. An inert atmosphere (Ar) nozzle was placed opposite the welding torch (on the opposite side of the ⅛-inch vertical sheet) and also traveled at 80 inches per minute. This inert gas prevented oxidation of the back side of the weld and possibly improved weld penetration.

After the welding was completed, the joint was subjected to a fracture test and the joint exhibited a shear-tensile strength of 5200 pounds per linear inch of weld.

EXAMPLES 2-5

Employing the same welding equipment, parameters and inert atmosphere, in a like manner four additional joints were welded in each case employing as the vertical member a ⅛ inch thick (by 2 inch by 3 inches) aluminum alloy 5456 extrusion placed upon a 3/16 inch thick aluminum alloy 5456 sheet. The abutting edge of the vertical member had alternating 1 inch lands and slots 1 inch in length and 0.040 inches in height. The operating conditions and the results of shear-tensile strength tests to which 4-inch long sections of each of the welds were subjected are set forth in the following table.

| Example | 2 | 3 | 4 | 5 |
|---|---|---|---|---|
| Welding current, amps | 230 | 230 | 230 | 230 |
| Voltage, volts | 19 | 20 | 20 | 20 |
| Machine speed, inches/min. | 75 | 75 | 75 | 75 |
| Electrode feed, inches/min. | 510 | 510 | 510 | 510 |
| Characteristic slope, percent | 75 | 75 | 75 | 75 |
| Shear-Tensile Strength, pounds/inches of weld | 19,300 | 19,060 | 18,830 | 19,180 |

EXAMPLE 6

The same welding technique as in Example 1 was used in this Example 6, except for the differences as noted in the following. The welding current was 220 amperes and the arc voltage was 20.5 volts. The welding head was set to move along the joint at a speed of 75 inches per minute. The consumable aluminum electrode was fed at a speed of 556 inches per minute. The argon atmosphere fed through the nozzle opposite the welding torch was at a rate of 60 standard cubic feet per hour. The slot length was 1¼ inches and the land length was ¼ inch.

The weld of this Example 6 was subjected to fatigue testing and the single pass fillet weld compared favorably to the performance of two sided fillet welds.

It will be understood that the above description of the present invention is susceptible to various modifications, changes, and adaptions and the same are intended to be comprehended within the meaning and range of equivalents of the appended claims.

What is claimed is:

1. A welding method for forming a fillet welded joint comprising the steps of placing an abutting edge of a first metal member onto a surface of a second metal member at generally right angles thereto, the abutting edge having a series of alternating lands and slots extending through the entire thickness of said first member, and arc welding employing a consumable electrode to form a fully penetrated fillet weld from one side only of the joint with the weld filling said slots and melting said lands.

2. A method according to claim 1, wherein both said first member and said second member are aluminum, and said consumable electrode is aluminum.

3. A method according to claim 1, further comprising surrounding the consumable electrode with an inert gas atmosphere.

4. A method according to claim 1, wherein the slots are a maximum of about 0.040 inches for a ⅛-inch thick member.

5. A method according to claim 4, wherein the ratio of the length of said lands to the length of said slots is between about 1:20 to 1:1.

* * * * *